Sept. 28, 1971 V. J. CUSHING 3,608,375
ELECTROMAGNETIC FLOWMETER
Filed Nov. 5, 1968 4 Sheets-Sheet 2

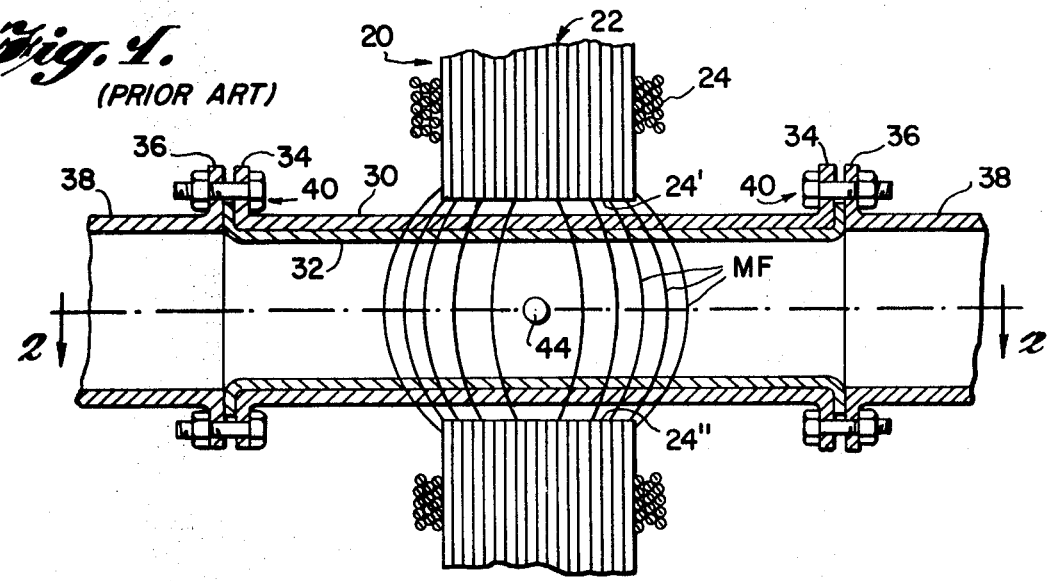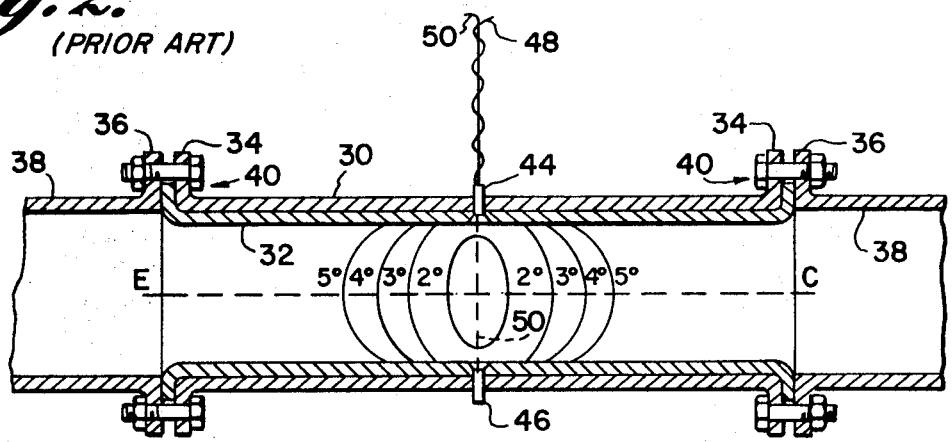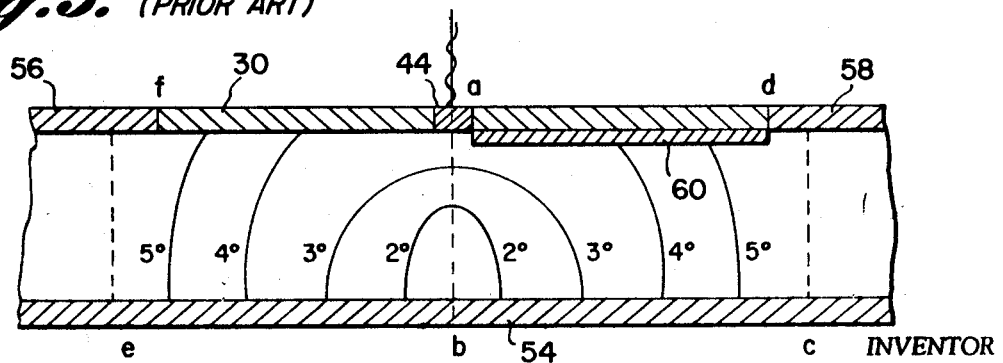

INVENTOR
VINCENT J. CUSHING

BY *Bryan and Butrum*

ATTORNEYS

Sept. 28, 1971 V. J. CUSHING 3,608,375
ELECTROMAGNETIC FLOWMETER
Filed Nov. 5, 1968 4 Sheets-Sheet 3

INVENTOR
VINCENT J. CUSHING

BY *Bryan and Butrum*

ATTORNEYS

3,608,375
ELECTROMAGNETIC FLOWMETER
Vincent J. Cushing, 9804 Hillridge Drive,
Kensington, Md. 20795
Filed Nov. 5, 1968, Ser. No. 773,386
Int. Cl. G01f 1/00; H01f 15/02
U.S. Cl. 73—194EM                                    1 Claim

ABSTRACT OF THE DISCLOSURE

A tubular flow conduit includes a pair of detecting electrodes adjacent thereto, one of said electrodes being a high impedance electrode and another of said electrodes being a low impedance electrode. An electromagnet means is provided of unique construction for producing an alternating magnetic flux which is of substantially the same phase throughout a substantial region of the flowmeter so that the circuit loops within the flowmeter and including the high impedance electrode are threaded by susbtantially no magnetic flux which is coherent and phase-shifted relative to the magnetic flux which generates the flow signal in fluid flowing through the tubular means.

---

Certain features of the invention described herein were made in the performance of work under a NASA contract and are subject to the provisions of the National Aeronautics and Space Act of 1958, Public Law 85–568 (72 Stat. 426; 42 U.S.C. 2451), as amended.

BACKGROUND OF THE INVENTION

The present invention relates to an electromagnetic flowmeter and is particularly directed to an arrangement for overcoming the problem of the so-called "transformer effect" parasitic hum associated with an alternating magnetic field.

In the prior art, variations in "transformer effect" hum level cause a serious problem where alternating magnetic fields are employed, and it has been a common practice to employ phase-sensitive detectors for rejecting the undesired hum. Such phase sensitive detectors are effective only if the variation in hum level does not have a concomitant variation in electrical phase of the hum.

Heretofore, the mechanism of hum generation has not been well understood. Experience with conventional electromagnetic flowmeters has shown that the phase of the hum has shifted from time to time when any one of the following physical variations takes place: (1) contamination build-up at the walls of the tubular flow conduit, (2) variation in electrical properties of the metered fluid flowing through the conduit means, (3) variation in electrical properties of the tubular conduit means itself, (4) dimensional variation in the structure of the transducer as may be caused for example by temperature change, and (5) variation in magnitude of the alternating magnetic field.

The slight phase-shifting which may be caused by any one of the five abovementioned physical variations is interpreted by a conventional phase-sensitive detector as a variation in flow rate. In other words, there is a zero-point or baseline drift of the flow measuring instrument. This undersirable mode of operation has been longstanding in conventional insulator-lined flowmeters useable with certain adequately conductive liquids. It has also been experienced with conductor-lined electromagnetic flowmeters which are operative with both conductive as well as dielectric liquids as disclosed for example in U.S. Pat. No. 3,329,020.

The problem has generally been greater in a conductor-lined type of electromagnetic flowmeters since the magnetic induction frequency is higher than the 60 Hz. frequency customarily employed with conventional insulator-lined forms of flowmeters. Accordingly, a particular purpose of the present invention is to cause a substantial reduction in the zero-point drift.

It can be shown that a fluid flowing with velocity $u$ through a magnetic induction $B$ generates a polarization per unit volume $P$ described by (using the MKS system of units throughout this discussion)

$$P = K_0 Z u \times B \qquad (1)$$

where $$Z = 1 - i\omega K_0/S \qquad (2)$$

where $$S = \sigma + i\omega K K_0 \qquad (3)$$

and where $S$ is the complex conductivity of the metered fluid, $\omega$ is the angular frequency of magnetic induction, $\sigma$ is the electrical conductivity of the metered fluid, $K_0$ is the permittivity of free space, $K$ is the relative permittivity of the metered fluid, and $i$ is $(-1)^{\frac{1}{2}}$ as employed in electrical theory. According to classical potential theory we know that any potentials developed in the flow conduit due to this distribution of $P$ throughout the metered fluid will be in phase with the magnetic induction $B$ provided (1) the electrical conductivity $\sigma$ is adequately large, or (2) the electrical conductivity $\sigma$ is negligible compared with $i\omega K K_0$. If the magnetic induction $B$ is everywhere the same phase, then that will be the phase of any flow generated potentials; on the other hand, if the phase of $B$ varies from point to point throughout the fluid, then the phase of the generated potentials will depend on the spatially integrated effects of the vari-phase distribution of the volume polarization $P$.

Most electromagnetic flowmeters make use of an alternating magnetic induction: when used with conducting liquids in order to obviate deleterious electrochemical EMF's at the electrodes; when used with dielectric fluids in order to avoid effects of electrical relaxation in the metered fluid and in its attendant voltage detection apparatus.

The alternating magnetic induction necessarily threads in some measure the various discrete and distributed circuit loops associated with the transducer of the electromagnetic flowmeter, and this gives rise to the possibility of so-called "transformer effect hum," i.e., a hum voltage generated whether or not the metered fluid is flowing. If the flowpipe transducer and its contents are in all respects perfectly symmetric with respect to the magnetic field, the net hum is zero—but such perfect symmetry is rarely, if ever, attainable because of practicable fabrication tolerances, dimensional changes due to temperature, etc.

This spurious hum is dependent on the time-rate-of-change $\dot{B}$ of the alternating induction; whereas, as noted above, the flow generated voltage is dependent on $B$ itself. Ideally, then, any hum is expected to be in time quadrature with the flow generated voltage, and the standard practice of phase-sensitive detection can be employed to reject the hum. One proviso, however, is that the quadrature (i.e., the hum) voltage variation should not become overly large compared with the flow generated voltage since practicable phase-sensitive detectors are not perfect and some small measure of quadrature voltage may leak or cross-talk into the flow signal channel.

Variation in the magnitude of hum in past flowmeters has not been a serious problem. The serious experience is that in practice the flow generated voltage and the hum voltage are not precisely in time quadrature; and worse yet, the phase relationship between these two voltages is not constant, but it varies from time to time due to heretofore unknown causes. With such variations in phase relationship, the variphased hum level is sensed, after phase-sensitive detection, as a variation in flow signal baseline or variation in zero-point of the instrument. In other words, the overall flowmeter system output indication suffers a bias which varies from time to time depending on the electrical properties of the metered fluid, the electrical properties of the flowpipe, voltage applied to the magnet, build-up of contamination at the walls of the flow conduit, and other factors.

The general cause of the zero-point drift is the same for conventional insulator-lined and for conductor-lined flowmeters, but in the interest of brevity, the cause will be described in the configuration of the more conventional insulator-lined version.

The heart of the problem is that earlier electromagnetic flowmeter practice has permitted inordinate generation of spurious eddy currents, and these eddy currents modify both the amplitude and more importantly the phase of the magnetic induction. At the outset, it is assumed that the metered fluid itself does not produce eddy currents which can appreciably affect the magnetic field. This assumption is valid if the diameter of the flow conduit is small compared with the characteristic length (sometimes called the "skin depth") $\delta$ described by $$\delta = (2/\omega\sigma\mu_0)^{1/2} \quad (4)$$

where $\mu_0$ is the permeability of free space. In practice, this assumption is unquestionably valid for all dielectric as well as conductive fluids of interest; possibly with the exception of liquid metals, or if the alternating magnetic induction frequency is inordinately high, on the order of 30 mega Hertz. In brief, then, eddy current generation in the metered fluid itself is entirely negligible in almost all practicable flowmeter applications.

Significant eddy currents may be generated in one of the following places: (1) in the magnet core itself, (2) in a metallic pipe wall surrounding the flowpipe transducer or metallic flanges at the ends, (3) in the metallic shell which is the overall housing for the electromagnetic flowmeter primary unit, (4) in the conductive wire which makes up the magnet coil, and (5) in the electrodes and lead means associated with the flowmeter.

The conventional magnet core, consisting of magnet iron, and most often laminations of magnet iron is a major offender in the production of phase-shifting eddy currents. As long as the lines of magnetic flux do not shift from one lamination to another, the performance of such a magnet is perhaps tolerable; thus, the magnetic flux through the flowpipe in the neighborhood of the center of the transducer suffers minimum phase shift. Since the flux in the neighborhood of the detection electrodes contributes most to the generation of the electromagnetic flow signal, the prior art has concentrated on maintaining the phase of this portion of magnetic flux reasonably constant.

As the ends of the magnet pole piece are approached, the flux will fringe, i.e., it will bow out so that flux passes through the flow conduit considerably upstream and downstream of the magnet pole piece. This fringing flux has an axial component as it leaves the core, consequently considerably eddy currents are generated, and therefore the fringing flux will be increasingly phase-shifted (relative to that flux at the middle of the flow conduit) moving upstream and downstream in the flow conduit. We might note in passing that eddy current production in magnets heretofore used is not a linear function of the flux density in the core. Hence, variation in flux density (due, say, to variation in voltage applied to the coils of the electromagnet) causes a considerably change in the magnitude and phase distribution of the flux (particularly upstream and downstream of the magnet pole) within the flow conduits—and these variations are drastic in their contribution to zero-point drift.

Commercially available electromagnetic flowmeters also often employ a steel pipe of a substantial thickness outside of the insulator-liner. This is a correspondingly substantial seat for the generation of eddy currents, and therefore for the mechanism of phase-shifting the magnetic field in the interior of the flow conduit.

A third source of eddy current generation that can be significant is the overall metallic housing for the primary unit. As indicated above, the flux between the pole pieces of the magnet will fringe, and a significant portion of this flux can fringe as far as the metallic housing (or metallic end flanges, or metallic plumbing upstream and downstream), where it will generate eddy currents, and accordingly, will generate a measure of phase-shifted flux.

A fourth seat for eddy currents is in the conductive wire which makes up the magnet coil. If the magnet coil is made up of large diameter conductor, eddy currents can be produced which will contribute to the phase-shifting problem.

Additionally, eddy currents may also be produced within the various electrodes of the flowmeter as well as the leads associated therewith.

SUMMARY OF THE INVENTION

In the present invention, an electromagnet configuration and electrode configuration are employed so that all lines of magnetic flux that either by design or inadvertence thread any discrete or distributed circuit loop including the detecting electrode of high impedance are of substantially equal phase. The term isophase flux is employed herein to define flux which is of substantially equal phase throughout a particular region. In the present invention, every circuit loop associated with the high impedance detection electrode is threaded only by isophase magnetic flux. If this requirement cannot be met, as when a spurious ground loop is allowed to remain in play, then guard means must be interposed in order to raise the impedance or lower the admittance of the spurious ground loop so that any phase-shifted hum generated in the spurious loop is rendered ineffective. It is important that the circuit loop including the high impedance detecting electrode and any such interposed guard means be threaded only by isophase magnetic induction.

As described herein, the pertinent circuit loops including the high impedance detecting electrode must be threaded only by isophase magnetic induction. Clearly, however, it would be quite satisfactory if no flux threaded these pertinent circuit loops. Accordinly, a more precisely stated requirement is that these pertinent circuit loops should be threaded by substantially no flux which is coherent and phase-shifted relative to the flux which generates the flow signal.

In the present invention, an overall magnet configuration is employed which reduces deleterious eddy currents substantially to zero. This magnet configuration may be described as an isophase magnet configuration. It has not been heretofore realized that one must control the phase of $\dot{B}$ everywhere, even at considerable distances from the detection electrodes in order to maintain the hum contributing EMF $\epsilon$ as discussed hereinafter to be maintained at constant phase in accordance with the principles of the present invention. By providing an isophase magnetic field, any hum variation is not phase-shifted and thereby enables a standard phase-sensitive detector to reject variations in the hum level. The important overall effect is that no hum variation leaks or cross talks into the signal channel of the flow generated voltage, and consequently the zero-point drift is noticeably reduced or eliminated.

The novel electromagnetic means of the present invention includes a core means and a coil means, the core means defining a pair of spaced pole portions having an air gap therebetween in which the tubular flow conduit means is disposed.

The core means is formed of a material of high magnetic permeability to minimize eddy currents, and a magnetic shield means is provided including portions spaced from the pole pieces and interconnected therewith to define a low reluctance return path for magnetic flux which is effect short circuits spurious magnetic flux. This prevents any spurious magnetic flux from setting up undesired eddy currents in other components of the apparatus, while those components adjacent to the detecting electrodes are of such a construction as to reduce eddy currents to an absolute minimum.

The coil means may be formed of such a material as to reduce eddy currents as far as possible, and in addition the electrically conductive members such as the electrodes and the lead means associated therewith are so arranged as to be of a substantially eddyless construction.

BRIEF DESCRIPTION OF THE DRAWINGS

FIG. 1 is a vertical section through a conventional insulator-lined electromagnetic flowmeter;

FIG. 2 is a horizontal section taken through the flowmeter shown in FIG. 1 along line 2—2 thereof looking in the direction of the arrows;

FIG. 3 is an artificial flowmeter configuration for illustrating certain principles;

DESCRIPTION OF THE PRIOR ART

Figure 4:
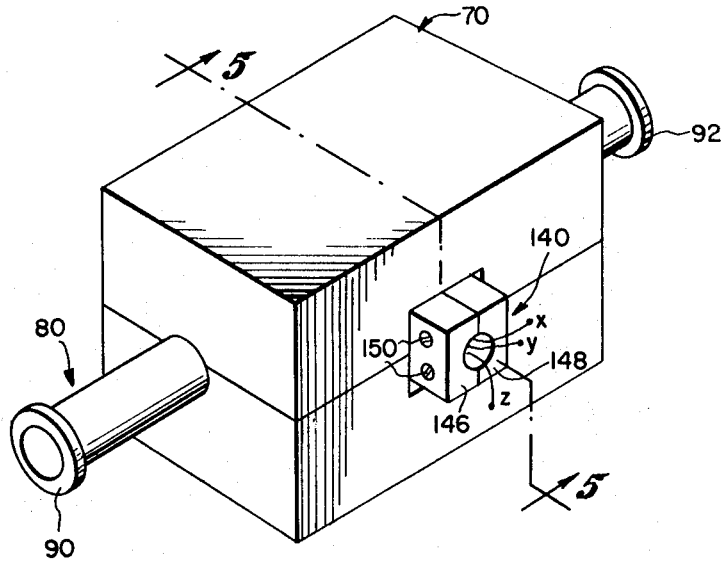
FIG. 4 is a top perspective view of an electromagnetic flowmeter according to the present invention.

Referring now to FIGS. 1 and 2 of the drawings, a conventional prior art insulator-lined electromagnetic flowmeter is illustrated comprising electromagnet means indicated generally by reference numeral 20 and including a laminated iron core 22 and associated magnet coil means 24, the coil means being powered at a frequency of for example 25, 50 or 60 Hz.

The flowmeter includes tubular flow conduit means 30 in the form of a steel pipe or the like, and a tubular liner 32 formed of electrical insulating material such as plastic or the like covers the inner surface of the steel pipe 30. Opposite ends of the liner are clamped between flanges 34 and 36 formed on steel pipe 30 and adjacent lengths of piping 38 respectively, nut and bolt assemblies 40 extending through suitable holes to clamp the flanges to one another as illustrated.

A pair of conventional small area detecting electrodes 44 and 46 are provided at diametrically opposite sides of the tubular flow conduit means, these electrodes being connected with leads 48 and 50 which in turn are adapted to be connected with suitable circuitry. The two detecting electrodes 44 and 46 are generally associated with a balanced or push-pull detection system, and the metallic end flanges of the piping are electrically grounded upstream and downstream of the flowmeter.

The lines of magnetic flux are illustrated by lines MF, and as seen in FIG. 1, the magnetic flux at the ends of the two spaced magnet pole portions 24' and 24" of the laminated core tend to bow out so that the flux passes through the flow conduit considerably upstream and downstream of the magnet pole portions. This fringing flux causes considerable eddy currents, and the fringing flux will be increasingly phase-shifted moving upstream and downstream in the flow conduit.

Referring now to FIG. 2, the lines of magnetic flux extend normal to the plane of the paper. The magnetic induction B is most intense and with minimum phase-shift along the line connecting the two detecting electrodes; and the magnitude of induction generally falls off with a corresponding increase in phase-shift moving upstream and downstream from the line connecting the detecting electrodes.

FIG. 2 illustrates typical magnetic induction isophase contours. Each of these lines indicates areas along which the phase-shift magnitude is constant. The values given do not represent actual values but are illustrative only so as to emphasize the progression in phase shift moving away from the region between the detecting electrodes.

In the electrically balanced configuration shown in FIG. 2, the line E–C by symmetry is a zero potential line, and for simplicity in discussing the zero-point drift problem, resort is made to the artificial flowmeter configuration shown in FIG. 3 wherein the equipotential line E–C as shown in FIG. 2 is replaced by an equipotential conductor 54. Equipotential, without loss of generality, can be defined as zero potential.

Typical isophase contours for the magnetic induction B have been transferred from FIG. 2 and are also plotted in FIG. 3. Parts shown in FIG. 3 similar to those of FIG. 2 have been given the same reference numerals. The portions 56 and 58 as well as 54 are considered to be electrically connected grounded conductors in this artificial configuration.

In order to see the very serious effect of the phase-shifted magnetic flux, particularly the heavily phase-shifted flux at the upstream and downstream extremes of the flow conduit, let us consider the following situation. Suppose the flow conduit configuration shown in FIG. 3 is initially without the asymmetric film of contamination 60. Under these circumstances, we can expect in general to have some amount of hum, $E_h$. If this hum remained invariant, there would be no serious problem since a hum compensation voltage could be superposed in accord with the prior art. We are therefore concerned only with variation in hum $\delta E_h$, especially if this hum variation has a concomitant phase shift.

Consider now that a film of contamination builds up on the insulator-lined wall of the flow conduit, as shown in FIG. 3. It is too much to expect that such a contamination build-up will be perfectly symmetric, and so let us consider that it is preferentially built up along the wall between the points $a$ and $d$, as shown. If this film has electrical properties even slightly different from the electrical properties of the metered fluid, the film will produce a change in impedance along the insulating wall between the detection electrode 44 at $a$ and a grounded end flange (34, not shown) at $d$. Rather than discuss these effects in terms of impedance changes, it is more convenient to talk in terms of reciprocal impedance, or admittance, A. We thus see that the contaminating film causes a change $\delta A$ in the admittance between the detection electrode 44 at $a$ and the grounded end flange at $d$. This change is admittance is part of a circuit loop consisting of $abcda$, and the EMF $\epsilon$ around this loop is expressed by $$\epsilon = \int_a \dot{B} \cdot da \qquad (5)$$

where the area $a$ of integration in Equation 5 consists of the area contained within the loop $abcda$ shown in FIG. 3.

If A is the nominal admittance (i.e., the reciprocal of the impedance) between the detection electrode and electrical ground, it can be shown that the variation in hum $\delta E_h$ is expressed by $$\delta E_h = \epsilon \delta A / A \qquad (6)$$

If the metered fluid is conductive, then A and $\delta A$ are both real (in the parlance of electrical theory); and if the metered fluid is dielectric, then A and $\delta A$ are both imaginary [refer to Equation 3 above]. But in any event, the ratio $\delta A / A$ is real, i.e., $\delta A / A$ causes no phase shift to the EMF $\epsilon$ discussed in connection with Equations 5 and 6 above. Thus we see that the variation in hum level $\delta E_h$ described by Equation 6 will suffer no variation in phase (and hence be capable of rejection by a phase-sensitive detector) provided the EMF $\epsilon$ defined by Equation 5 is not phase-shifted. But here lies the heart of the problem. We note from FIG. 3 that the phase of $\dot{B}$ shown in the integrand of Equation 5 in past practice has varied considerably throughout the area $abcda$ as shown in FIG. 3, and the phase variation is most serious at the upstream and downstream extremes of the flow conduit. It has heretofore not been realized that one must control the phase of $\dot{B}$ everywhere—even at considerable distances from the detection electrodes—if the hum contribution EMF $\epsilon$ defined by Equation 5 is to be maintained at constant phase.

If an isophase magnet configuration is employed, as described later in the specification, then we see that $\dot{B}$ as used in Equation 5 is everywhere of the same phase, and consequently the hum contributing EMF $\epsilon$ will be of constant phase. In turn, hum variations $\delta E_h$ of the kind described by Equation 6 will also be of constant phase.

We have discussed a very rudimentary picture of hum variation, and phase-shifted hum variation. The picture is rudimentary in that we have considered a discrete admittance variation $\delta A$ extending from the detection electrode at $a$ to the grounded flange at $d$, and this admittance variation has been localized along the wall of the insulating liner. The basic situation illustrated above, however, can be enlarged to consider the continuum of circuit loops or distributed circuit loops which actually exist in an extended medium such as the metered fluid within the flow conduit. Qualitatively, one can say that localized build-ups of such wall contamination (not necessarily continuous all the way from the detection electrode at $a$ to the grounded flange at $d$, as shown in FIG. 3) will cause a redistribution of circulating currents within the metered fluid and will consequently cause a variation in hum level. If the redistribution of circulating currents at the same time encompasses a different bundle of magnetic flux lines $\dot{B}$, and if the magnetic flux lines vary in phase from point to point, then we can expect a variation in both the magnitude (not serious) and phase (serious) of the hum EMF $\epsilon$, where the hum EMF is dependent on a spatial summation or integration of the kind described by Equation 5.

Such a more generalized, continuum analysis would appear to be quite complicated; but fortunately the analysis need not be carried out at this juncture, for the rudimentary analysis points out the way to eliminate phase shift of the hum: make sure that $\dot{B}$ is everywhere substantially of the same phase (at least in all discrete as well as distributed circuit loops which include the detection electrode), so that all hum EMF's and variations thereof will correspondingly be of constant phase. With such constant phase hum EMF's $\epsilon$, we se from Equation 6 that variations in the conductive geometry (i.e., contaminant surface films, variation in electrical properties of the metered fluid, movement of the lead wires in the neighborhood of the transducer, variation in electrical properties of the containing pipe) may allow a variation in magnitude of the hum, but it will not be accompanied by a variation in phase of the hum.

DESCRIPTION OF THE PREFERRED EMBODIMENTS

Figure 5:
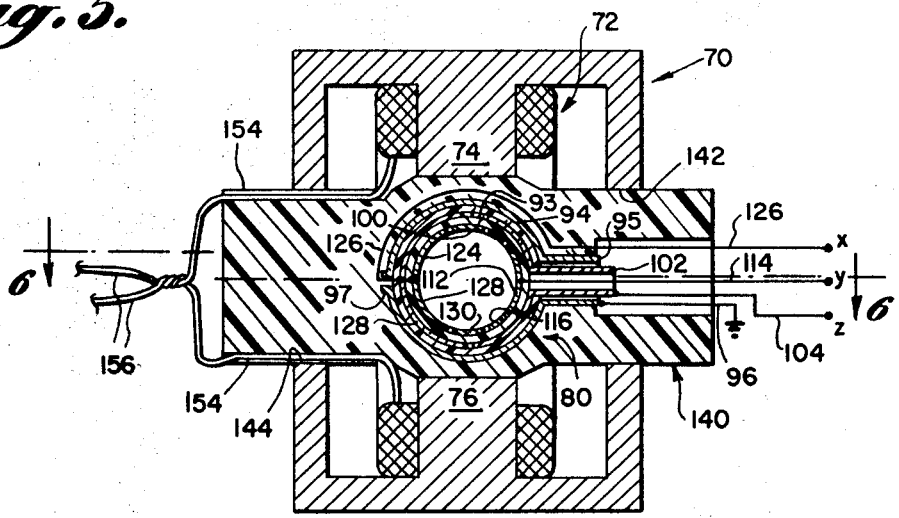
FIG. 5 is a sectional view taken substantially along line 5—5 of FIG. 4 looking in the direction of the arrows.
Figure 6:
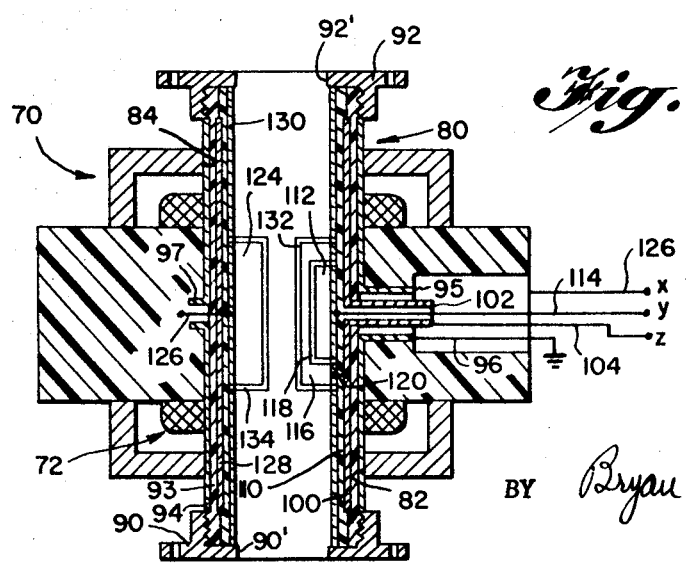
FIG. 6 is a sectional view taken substantially along line 6—6 of FIG. 5 looking in the direction of the arrows.

Referring now to FIGS. 4–6 inclusive of the drawings, the objective of the electromagnet structure of this form of the invention is such that B (and correspondingly $\dot{B}$, which is in time quadrature) is substantially of constant phase—at least, where the magnetic flux threads any discrete or distributed circuit loops associated with the detection electrode. Such an isophase magnetic field guarantees that any hum variation is not phase-shifted, and consequently enables the standard practice of phase-sensitive detection to reject these variations in hum level. The important overall effect is that no hum variation leaks or cross-talks into the signal channel of the flow generated voltage, and consequently the zero-point drift is notably reduced or eliminated.

The electromagnet means of this form of the invention includes core means indicated generally by reference numeral 70 and coil means indicated generally by reference numeral 72. The core means is formed of a material of high magnetic permeability to minimize eddy currents. A typical suitable permeable material is ferrite core material manufactured by Allen Bradley Company, Milwaukee, Wis., or flake iron or powdered iron core material such as manufactured by Arnold Engineering Company, Morengo, Ill. As mentioned previously, the core means may be formed of a powdered ferrite material, and this material can be bonded together with a resin under pressure or sintered in order to form the finished core means as illustrated in the drawings.

As seen particularly in FIGS. 5 and 6, the core means defines a substantially enclosed box-like configuration defining a pair of pole portions 74 and 76 in the central part thereof, these pole portions defining an air gap therebetween. A tubular flow conduit means indicated generally by reference numeral 80 is disposed within this air gap and extends through holes 82 and 84 provided in opposite ends of the core means as seen most clearly in FIG. 6.

It will be noted that the coil means is disposed within a cavity defined within the core means, the coil means being wrapped around the pole portions 74 and 76.

The tubular flow conduit means and the arrangement of electrodes associated therewith is substantially identical with that shown in FIGS. 11–13 inclusive of U.S. Pat. No. 3,329,020. As seen most clearly in FIG. 6, the transducer of this form of the apparatus includes a pair of opposite metallic end flanges 90 and 92 having suitable means for attachment to the associated conduit portions. These end flanges have central holes 90' and 92', respectively, formed through the central portions thereof and defining a portion of the fluid flow path through the flowmeter. A first tubular member 93 formed of a suitable dielectric material such as fiberglass or the like is provided with threads on the outer surface thereof adjacent opposite end portions thereof for attachment to the end flanges. A ground shield means 94 is disposed peripherally about member 93, this ground shield preferably being in the form of a thin layer of conductive material. This ground shield is connected with a tubular member 95 which in turn is connected by a lead 96 to ground. Ground shield 94 is also connected with a tubular member 97 surrounding a lead hereinafter described.

The ground shield 94 is mounted on the outer surface of member 93, and a shield means or screen electrode 100 is disposed at the inner surface of member 93. Shield means 100 is connected with a conductive tubular member 102 disposed concentrically within tubular member 95, member 102 in turn being connected by a lead 104 with a terminal $z$. A tubular member 110 of fiber glass and the like is disposed concentrically within member 93, the shield means 100 being sandwiched between members 93 and 110.

A relatively high impedance detecting electrode 112 is disposed on the inner surface of member 110 and is connected with a lead 114 which extends coaxially within tubular member 102 previously described. Lead 114 serves to connect the relatively high impedance detecting electrode 112 with a terminal $y$.

A guard ring 116 is provided, the high impedance detecting electrode 112 being of substantially rectangular configuration, and the guard ring 116 being disposed in spaced surrounding relationship to the high impedance electrode and a small gap 118 separates the outer periphery of the detecting electrode 112 from the associated guard ring. Guard ring 116 is connected by a lead 120 with the shield means 100 previously described.

A relatively low impedance detecting electrode 124 is disposed in opposed relationship to detecting electrode 112, the low impedance detecting electrode being connected to a lead 126 extending coaxially within the tubular member 97 previously described. Lead 126 connects the low impedance detecting electrode with a terminal $x$. Lead 126 is also connected to a shield electrode 128 disposed symmetrically opposite to the aforementioned electrode 100 and separated therefrom by small insulating gaps.

A screen electrode 130 is provided, this screen electrode being disposed in surrounding relationship to the guard ring 116, there being a small insulating gap 132 between the guard ring and the shield electrode and extending completely peripherally about the guard ring. In a similar manner, the screen electrode 130 is spaced from the relatively low impedance detecting electrode 124, a small insulating gap 134 being disposed peripherally about the low impedance detecting electrode.

It will be noted as seen in FIG. 6 that portions of the guard ring 116 are disposed both upstream and downstream of the relatively high impedance detecting electrode 112, and that portions of the screen electrode 130 in turn extend even further upstream and downstream of the high impedance detecting electrode and its surrounding guard ring. The potentials on both the guard ring and the screen electrode are established by means of an associated electrical network at a potential which is a linear function of the potentials on the two detecting electrodes. In the case of the screen electrode 130, opposite ends of this screen electrode are illustrated as being electrically connected with the end flanges 90 and 92 which are considered to be grounded. In this case, the potential on the screen electrode is a linear function of the two detecting electrodes, the proportionality constants being zero. If desired, the screen electrode 130 might be eliminated and the guard ring extended considerably further upstream and downstream of the high impedance detecting electrode and extending almost all the way to the end flanges, but being spaced slightly therefrom to avoid short circuiting, since these end flanges are considered to be grounded.

Referring to FIG. 5, the leads connected with terminals $x$, $y$ and $z$ as previously described are supported and surrounded by an umbilical means indicated generally by reference numeral 140. This umbilical means is formed of a non-eddy current producing insulating material such as Bakelite or the like and extends through holes 142 and 144 formed at opposite sides of the core means. As seen especially in FIG. 4, the umbilical means may be formed of two halves 146 and 148 secured to one another by means of nylon screws 150 and the like.

As seen in FIG. 5, the left-hand side of the umbilical means is provided with grooves 154 in the upper and lower surfaces thereof for receiving leads 156 to the coil means 72.

The terminals $x$, $y$ and $z$ as defined hereinabove correspond to similar terminals described in U.S. Pat. No. 3,329,020 wherein suitable output circuits are illustrated in FIGS. 15–18 inclusive for connection with the terminals $x$, $y$ and $z$ respectively of a flowmeter as illustrated in the present application.

In its most efficient form, the core means is fully closed except for the necessary holes through which the flow conduit passes, and through which the various detection circuit wires and magnet coil wires pass. The magnet coil is disposed within the interior of the box-like magnet; and its magnetomotive force produces an intense magnetic field in the interior of the structure, but substantially none of this flux finds its way to the exterior. That is, the magnetic intensity due to the powered magnet coils is effectively zero on the exterior of this box-like magnet configuration; hence, effectively no hum EMF is contributed by any circuit loops or portions of circuit loops exterior of the magnet configuration.

The magnet coils generate a MMF which produces a magnetic flux between the pole portions, i.e., in the air gap between the poles through which the flow conduit passes. The return path for these lines of magnetic flux is through the permeable magnetic material which makes up the walls of the box-like magnet structure itself.

Within the magnet structure, there are no substantial amounts of conductive material that can produce eddy currents, and consequently, the magnetic flux everywhere on the interior, whatever its direction may be, is of constant phase. Hence, those portions of the transducer's circuit loops which are in the interior of the magnet structure can generate only constant phase hum. In particular, every circuit loop which has substantial electrical admittance to the high impedance detection electrode is threaded by constant phase flux. It is well known in electrical practice that we can measure terminal voltage in a generator such as in an electro-magnetic flowmeter, provided the external load such as the associated electrical network is high impedance. In fact, the load impedance must be many times higher than the generator's internal impedance for accuracy. Therefore, of the two terminals of the associated electrical network which are connected to the two detecting electrodes, at least one of the terminals must have a high input impedance. As the term is employed in this case, a detecting electrode which is electrically connected to a high input impedance terminal of the associated electrical network is called a high impedance detecting electrode. If the geometry of these loops should vary—due, say, to thermal expansion or other stresses—then the associated variation in hum EMF will remain at constant phase. Furthermore, if the electrical properties of circuit loops associated with the high impedance detection electrode should vary due to changes in electrical properties of the metered fluid or electrical properties of the dielectric pipe, then these can result only in a constant phase variation in hum.

The substantially closed box-like structure shown in FIGS. 4–6 has only the necessary minimal number of holes in it, as described above. However, shielding theory and practice indicates that effective results can still be obtained with a less closed envelope or box. But there must be a sufficient amount of non-eddy current producing magnetic permeable material making up the walls of the magnetic envelope such that these walls effectively shield or isolate the interior magnetic flux from coming into contact with substantial eddy current producing materials such as the flowpipe flange, or the overall metallic housing for the magnet and flowpipe, or an adjacent preamplifier housing and the like.

Construction of the magnet, and especially the pole portions, from the above described non-eddy current producing materials still allows the unavoidable upstream and downstream fringing of the kind noted in FIG. 1, but these fringe fields upstream and downstream of the magnet pole portions which play such an important role in the zero-point drift are the same phase as the magnetic lines of flux elsewhere within the flow conduit.

A principal objective of the substantially enclosed magnet field configuration is to prevent the alternating magnetic induction from encountering substantial amounts of eddy current producing conductive material such as the metallic end flanges and the metallic housing for the overall primary unit.

The umbilical means contains the three lead wires leading to (1) the high impedance detection electrode, (2) the low impedance detection electrode, and (3) the guard electrode. The magnetic field fringes through these circuits, but again the non-eddying magnet construction, especially in the pole portions, ensures that the flux which threads these transducer lead circuits is of the same phase as the magnetic lines of flux within the flow circuit.

The coil means necessarily requires a substantially amount of conductive material due to power dissipation considerations. In order to minimize eddy currents, a suitable material such as Litz wire, manufactured by New England Electric Wire Corporation, Lisbon, N.H., may be employed in the coil means. All other necessary conductors in the isophase magnet are kept to a minimum. The wide area electrodes comprising the detecting electrodes and the guard means as well as the screen electrodes can be made of a very thin material such as foil or conductive paint, and if necessary such materials could be articulated or laminated as disclosed for example in the aforementioned U.S. patent in order to minimize eddy current production arising from the required alternating magnetic induction.

Figure 7:
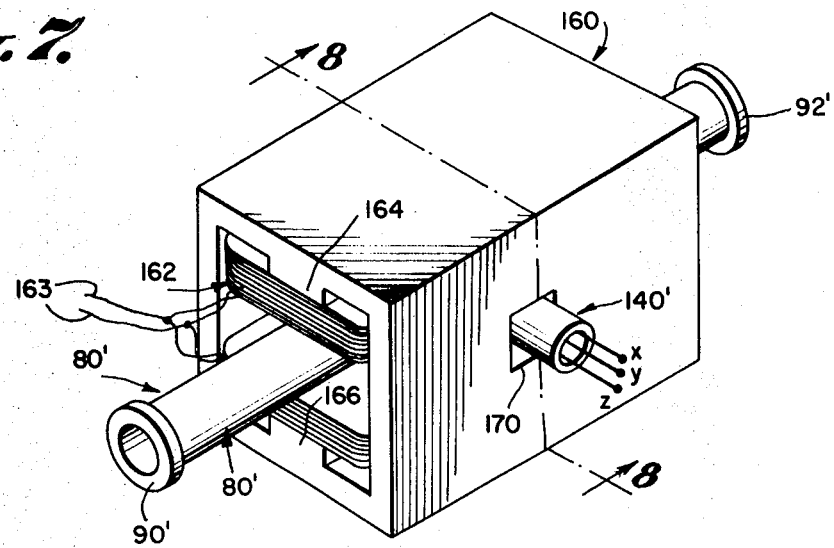
FIG. 7 is a top perspective view of a modified form of the present invention.
Figure 8:
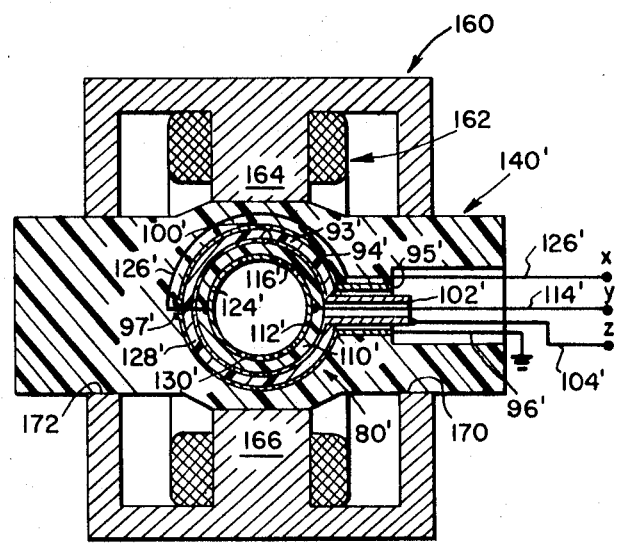
FIG. 8 is a sectional view taken substantially along line 8—8 of FIG. 7 looking in the direction of the arrows.

Referring now to FIGS. 7 and 8 of the drawing, a modified form of the invention is illustrated. In this modification, an elongated E-type magnet is employed including core means 160 and coil means 162. The core means in this form of the invention is also formed of a core material of high magnetic permeability to minimize eddy currents. As seen particularly in FIG. 8, the core means defines spaced pole portions 164 and 166 defining an air gap therebetween. The tubular flow conduit means and the umbilical means associated therewith are substantially identical with those discussed in connection with the modification shown in FIGS. 4-6, and accordingly these components have been given the same reference numerals primed.

As seen in FIG. 8, the flow conduit means 80' is disposed in the air gap defined between the pole portions of the core means. The umbilical means 140' extends through holes 170 and 172 formed in opposite sides of the core means. Leads 163 as seen in FIG. 7 are connected directly through the open ends of the core means with the coil means disposed therewithin.

The long dimension of the E-type magnet core extends parallel with the longitudinal axis of the flow conduit means. This type of configuration is suitable although not quite as satisfactory in its function as the configuration illustrated in FIGS. 4-6.

As seen in FIG. 8, the central portions of the flow conduit means in the neighborhood of the high impedance detecting electrode (where the flow induced voltage is mostly generated) and the circuit loops associated with the high impedance electrode, the low impedance electrode, and the guard electrode, are all threaded by isophase magnetic induction. As usual, fringing flux field encounters the conductive end flanges and the adjacent conductive flowmeter housing. The induced eddy currents in these conductors produce a phase-shifted magnetic field; however, these would-be deleterious eddy currents are separated from the aforementioned central portions of the magnet (where the flow signal is mostly produced, and where the pertinent transducer circuit loops are located) by a large distance containing high permeability magnetic core material. Shielding aspects of potential theory make it clear that the central portions of the magnet are effectively shielded (by the considerable amount of high permeability core material) from the phase-shifted secondary magnetic field and consequently, the above mentioned pertinent important circuit loops are not threaded by any substantial amount of phase-shifted flux; and thus no false indication of flow signal is generated in these important circuit loops.

The long E-type magnet of FIG. 7 endeavors to reduce the important portions of the magnetic field to a two-dimensional situation; and it does this by the practice of making the magnet sufficiently long so that end effects have a negligible influence on magnetic phenomena taking place in the central portions of the magnet. The flow generated signal is due to the $u \times B$ induction mostly in the central portions of the magnet; and the pertinent circuit loops are also located near the central or middle regions of the E-type magnet. The deleterious phase-shifted magnetic field, due to eddy current production at the ends of the magnet (due, say, to interaction with metallic end flanges) cannot reach back into these pertinent central regions because of the above described shielding aspects of the long magnet.

As seen in FIG. 8, the lead to the high impedance detection electrode is brought out in a fully shielded configuration to the terminal $y$. The guard shield electrodes in the transducer are connected to the shield of the coaxial transmission line in the umbilical, and in turn, this is brought out to the terminal $z$. The low impedance detection electrode is brought out through a lead wire to the terminal $x$. The terminals $x$, $y$ and $z$ again correspond to the $x$, $y$ and $z$ terminals previously described which can be connected in a suitable electrical network as shown for example in the previously mentioned U.S. patent.

The magnet of FIG. 7 has a cut-out in the wall of the magnetic material in order to bring through the umbilical means, which contains the lead wires to the two detection electrodes and the guard/shield. Such a cut-out is acceptable if the magnetic core material consists of material which produces substantially no eddy currents. However, if the magnetic core material consists of a laminated stack, then the umbilical cut-out will prompt fringing of flux within the cut-out, and as we have already discussed, such fringing flux from a laminated stack will produce phase-shifted flux. If this phase-shifted flux is produced in the immediate neighborhood of the umbilical means, which contains the important pertinent circuit wires, then difficulty can be expected. Conceivably, some measure of magnetic shielding could be provided around these pertinent circuit loops so that any such phase-shifted flux would have no substantial threading of the pertinent circuit loops.

Figure 9:
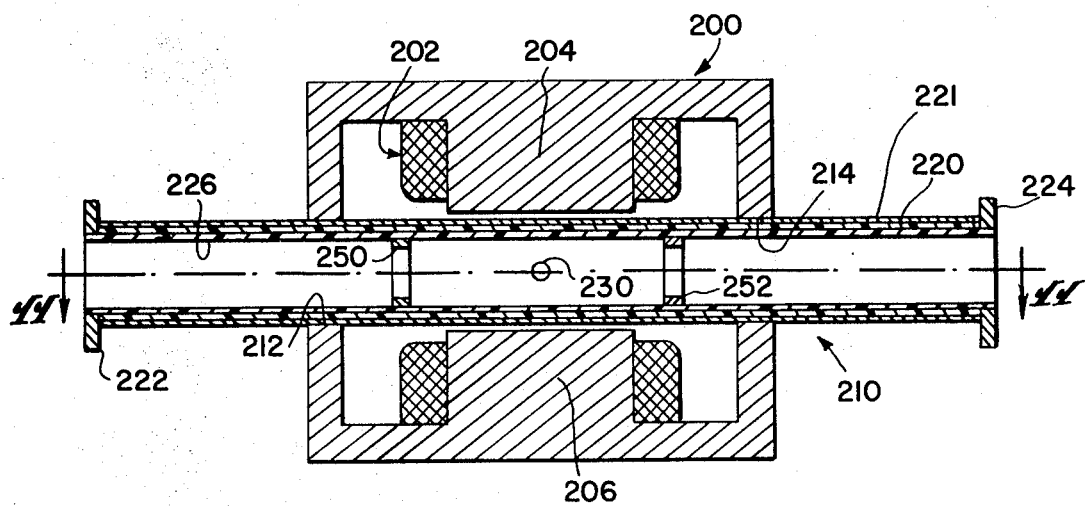
FIG. 9 is a vertical section through a further modified form of the invention.
Figure 10:
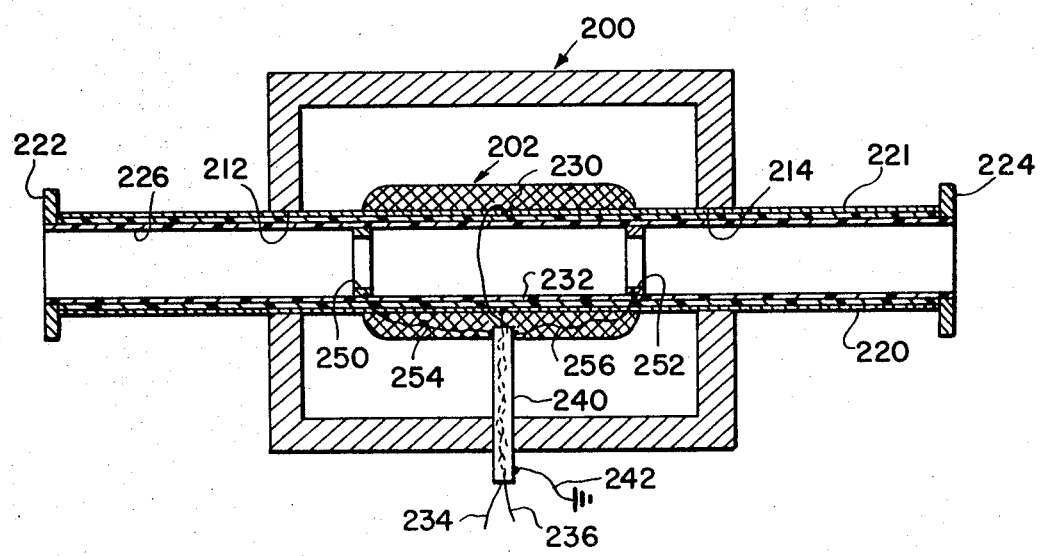
FIG. 10 is a sectional view taken substantially along line 11—11 of FIG. 9 looking in the direction of the arrows.

Referring now to FIGS. 7 and 10 of the drawings, still another form of the invention is illustrated. The previously described forms of the invention illustrate magnetic flowmeters of the conductor-lined type. FIGS. 9 and 10 illustrate an isophase magnetic field arrangement employed with the more traditional insulator-lined electromagnetic flowmeter. The former type of flowmeter can be made insensitive to the electrical properties of the metered fluid, and thus is usable with both conductive and dielectric liquids. The conventional insulator-lined version is usable only when the metered fluid has an electrical conductivity which is large compared with the electrical conductivity of the insulating wall, and consequently is usable only when the metered fluid is sufficiently conductive.

As seen in FIGS. 9 and 10, the core means is indicated generally by reference numeral 200 and is formed of a material of high magnetic permeability so as to minimize eddy currents. Coil means 202 is disposed around the pole portions 204 and 206 of the core means. These pole portions define an air gap, and the tubular flow conduit means indicated generally by reference numeral 210 is disposed in this air gap. The flow conduit means extends through holes 212 and 214 formed in the opposite ends of the substantially enclosed box-like core means which defines a cavity therewithin receiving the coil means.

A flow conduit 220 is provided formed of a suitable dielectric material having a thin conductive layer 221 on the outer surface thereof. Metallic end flanges 222 and 224 are connected to the opposite ends of conduit 220, and layer 221 is connected to these end flanges which are electrically grounded. A liner 26 of electrical insulating material is provided on the inner surface of the flowpipe so as to provide an inner electrically non-conductive surface through which the metered fluid flows.

A pair of small area detecting electrodes 230 and 232 are provided at diametrically opposite sides of the flowpipe and are connected with leads 234 and 236 which in turn are associated with suitable circuitry. These leads 234 and 236 extend through a thin tubular shield member 240 to minimize eddy currents. This shield means is formed of electrically conductive material and is connected by a lead 242 with ground.

A pair of guard means 250 and 252 are provided on the inner surface of the flow conduit means, these guard means being formed of electrically conductive material and being preferably circumferentially closed. It will be noted that the two guard means are located upstream and downstream of the detecting electrodes. These two guard means are connected by leads 254 and 256 with the shield means 240 aforedescribed.

As seen in FIG. 10, a pertinent circuit loop passes from ground to each of the guard means, thence through the metered fluid to one of the detecting electrodes, thence back through a circuit wire to a terminal connection. It is important that this circuit loop which contains one of the detecting electrodes is threaded only by isophase magnetic flux so that any hum which happens to be generated is not phase-shifted with consequent generation of a false flow signal.

It is to be noted that the conductive end flange (and/or the conductive plumbing) upstream or downstream of the flowpipe also is part of a circuit loop associated with the detecting electrode. For example, one such loop goes from the ground through a usually unspecified (and oftentimes multiple) path to an end flange, thence through the fluid to a detecting electrode and back out to a terminal. If the flux which threads this generally ill-defined loop is known to be of constant phase, then the guard means is not necessary, for this ordinary or natural ground circuit loop would produce no phase-shifted hum and therefore not be troublesome in producing false flow indication. But almost always, these ill-defined natural ground loops are not threaded by isophase flux, and if the guard means is not employed, the phase-shifted hum EMF can produce a substantial false flow signal. However, interposition of a guard means between a detecting electrode and the natural ground at the end flange reduces the electrical admittance (according to shielding theory) through the fluid between the detecting electrode and the natural ground at the end flange. Consequently, the deleterious phase-shifted hum through the regular ground loop is cut to insubstantial proportions whenever the guard means is interposed. It is emphasized that with the guard means in place, the natural ground loop is rendered ineffective, but the ground loop including the grounded guard means and the detecting electrode is effective, and it is important that the circuit wires constituting this loop be placed such that they are threaded only by isophase magnetic induction.

The conductor-lined electromagnetic flowmeter, as shown in FIGS. 4–8, inherently has a guard system upstream and downstream of a detecting electrode, and so natural ground loops to the metallic end flanges are rendered ineffective in producing possibly phase-shifted hum.

It will be noted that in each of the various described modifications of the invention, a magnetic shield means is provided which effectively short circuits spurious flux thereby constraining the extent of the magnetic field. This magnetic shield means includes portions of the core means which are spaced from the pole portions thereof and interconnected with the pole portions to define low reluctance return paths to the pole portions for magnetic flux in the apparatus.

As this invention may be embodied in several forms without departing from the spirit or essential characteristics thereof, the present embodiment is therefore illustrative and not restrictive, and since the scope of the invention is defined by the appended claim, all changes that fall within the metes and bounds of the claim or that form their functional as well as conjointly cooperative equivalents are therefore intended to be embraced by the claim.

What is claimed is:

1. An electromagnetic flowmeter comprising a tubular means through which fluid is adapted to flow, detecting means adjacent said tubular means for detecting electrical signals in fluid flowing through said tubular means, said detecting means including two separate detecting electrodes electricall insulated from one another, one of said electrodes comprising a high impedance electrode, and another of said electrodes comprising a low impedance electrode, electromagnet means for producing an alternating magnetic flux which is of substantially the same phase throughout a substantial region of the flowmeter including those circuit loops which include said high impedance electrode whereby said circuit loops are threaded by substantially no magnetic flux which is coherent and phase-shifted relative to the magnetic flux which generates a flow signal in fluid flowing through said tubular means, said electromagnetic means including core means and coil means, said core means comprising a substantially homogenous non-eddy current producing magneitc permeable material, said core means including a pair of spaced pole portions defining an air gap therebetween, said tubular means being disposed in said air gap, said core means including magnetic shield means defining a low reluctance return path to said pole portions, said shield means including portions spaced from said pole portions and disposed both upstream and downstream of said electrodes as well as being disposed adjacent to portions of said tubular means, said core means defining a substantially enclosed structure surrounding said tubular means and substantially totally enclosing said pole portions, said core means having holes formed therethrough receiving said tubular means, and electrically conductive guard means for short circuiting any currents in the fluid caused by stray alternating flux exterior of said core means to prevent such currents from being sensed by the flowmeter, said guard means being disposed at the inner periphery of said tubular means and adapted to engage fluid flowing through said tubular means, said guard means including a first portion intermediate the upstream portion of the shield means and said detecting electrodes, said first portion of the guard means being spaced from and disposed downstream of the upstream portion fo the shield means, said guard means also including a second portion intermediate the downstream portion portion of said shield means and said detecting electrodes, said second portion of the guard means being spaced from and disposed upstream of the downstream portion of the shield means.

References Cited

UNITED STATES PATENTS

| | | | |
|---|---|---|---|
| 2,583,724 | 1/1952 | Broding | 73—194 |
| 3,209,294 | 9/1965 | Cornell | 336—134 |
| 2,771,771 | 11/1956 | Kamp et al. | 73—194 |
| 2,844,568 | 7/1958 | Mertz | 260—83.7 |
| 3,138,022 | 6/1964 | Mayer | 73—194 |
| 3,190,116 | 6/1965 | Romanowski | 73—194 |
| 3,274,831 | 9/1966 | Cushing | 73—194 |

RICHARD C. QUEISSER, Primary Examiner

J. WHALEN, Assistant Examiner

U.S. Cl. X.R.

336—83